Oct. 14, 1969    W. J. UPDEGRAVE    3,473,026
DENTAL INSTRUMENTS FOR STANDARDIZING THE BISECTING-ANGLE
TECHNIQUE FOR PERIAPICAL RADIOGRAPHY
Filed Sept. 21, 1966    2 Sheets-Sheet 2

United States Patent Office 3,473,026
Patented Oct. 14, 1969

3,473,026
DENTAL INSTRUMENTS FOR STANDARDIZING THE BISECTING-ANGLE TECHNIQUE FOR PERIAPICAL RADIOGRAPHY
William J. Updegrave, 616 W. Hortter St., Philadelphia, Pa. 19119
Filed Sept. 21, 1966, Ser. No. 581,090
Int. Cl. G01n 23/04, 21/34
U.S. Cl. 250—70                 5 Claims

ABSTRACT OF THE DISCLOSURE

A device for positioning dental X-ray film within the mouth for producing radiographs by the bisecting-angle technique having a bite portion with nonparallel upper and lower surfaces adapted to be clenched between the teeth and a backing portion projecting from the bite portion to support and prevent bending the film.

---

This invention relates to instruments used for positioning dental X-ray film within the mouth to produce radiographs of the teeth in accordance with the bisecting-angle technique and includes a unique bite block incorporating specific angular relationships thereof in conjunction with an X-ray unit aligning fixture to provide a standardized instrument for producing radiographs by the bisecting-angle principle.

In dental X-ray procedures, there are two well known techniques utilized for producing radiographs of the teeth. One of these is the paralleling technique in which the X-ray film is placed parallel to the long axis of the teeth during exposure thereof and in which the X-ray beam is directed perpendicular to the teeth and film. The second technique is the bisecting-angle technique in which one edge of the film is placed close to the tooth being examined and the X-ray beam is directed perpendicular to the horizontal axis of the X-ray film itself, but at an angle to the vertical axis of the film as controlled by directing the X-ray beam perpendicular to an imaginary plane which bisects the angle formed by the long axis of the tooth being X-rayed and the dental X-ray film. Both the paralleling technique and the bisecting-angle technique each have their own advantages and disadvantages. The advantages of the paralleling technique, together with the unique instruments for practicing this technique, have been thoroughly disclosed and discussed in United States Updegrave Patent No. 3,003,062, issued Oct. 3, 1961.

One of the advantages of the bisecting-angle technique is that shorter focal-film distances between the X-ray unit and the film may be utilized. In the case of the bisecting-angle technique, this distance may be, for example, 5 to 8 inches; whereas in the case of the paralleling technique, this distance may be in the order of 16 to 20 inches. Additionally, the bisecting-angle technique, due to the shorter focal distance, provides a reduced exposure time which is approximately four times shorter than that required in the paralleling technique. The consequent use of a shorter cone for the X-ray unit in the bisecting-angle technique will permit the use of a slower emulsion X-ray film with its attendant advantages. The shorter cone incident to the bisecting-angle technique also requires less room in the dental office than that required to practice the paralleling technique and consequently allows for greater maneuverability of the X-ray unit head.

One of the principal objections of the bisecting-angle technique is the difficulty encountered in aligning the X-ray beam so as to be perpendicular to the imaginary plane which bisects the angle formed by the plane of the X-ray film and the long axis of the tooth being X-rayed. It will, of course, be realized that if the X-ray beam is not directed perpendicular to the imaginary plane, elongation or foreshortening of the image will occur.

Another objection which is encountered in the bisecting-angle technique is the difficulty encountered in positioning the film within the mouth at the proper vertical angle with respect to the long axis of the teeth, as well as the proper horizontal angulation thereof. Proper positioning of the X-ray film is further complicated by the fact that many leading authorities in the field of dental radiography do not agree upon what the proper angle between the film plane and long axis of the teeth should be.

The procedure commonly used today is to place the film within the mouth and have the patient hold the film in place in his mouth by means of his thumb or finger. The resulting angulation by this method is thus only as good as the judgment of the operator. Further, the pressure exerted on the film by the patient's finger will frequently deform the film and result in objectional distortion in the resulting radiograph.

Proper vertical and horizontal angulation of the X-ray beam with respect to the imaginary plane is, by present practice, likewise difficult, as the bisecting plane is imaginary, and ascertaining the plane of the film and teeth is a matter of judgment. The procedure commonly used today for X-ray unit alignment requires specific positioning of the head and angulation of the X-ray unit with respect to the head and other imaginary references.

The foregoing procedures for bisecting-angle radiography lack any standardizaiton and to successfully practice the procedure, a great amount of skill, effort and experience is required.

The dental instruments of the present invention provide a simplified and standardized technique for bisecting-angle radiographs which properly position the film within the mouth and automatically indicate the correct positioning of the X-ray beam with respect to the film, as well as a device which eliminates the need for specific head positioning and X-ray unit angulation.

Accordingly, it is an object of the present invention to provide a device for positioning dental X-ray film within the mouth to produce radiographs by the bisecting-angle technique which will standardize and assure that the angle between the X-ray film and the long axis of the tooth being X-rayed will be within acceptable limits. This is accomplished by means of a unitary bite block which has a bite portion including nonparallel upper and lower surfaces and a film-backing portion projecting upwardly from the bite portion and in which the film-backing portion is so juxtapositioned with respect to the bite portion and of such a predetermined length, as to support the dental X-ray film in a manner such that the X-ray film will engage the interior of the mouth at a point to maintain the X-ray film in a flat plane and at a predetermined angle with respect to the long axis of the teeth being X-rayed whenever the device is disposed within the mouth and held between the opposing teeth at the bite portion of the bite block.

It is a further object of the present invention to provide a device for positioning dental X-ray film within the mouth for the production of radiographs which will assure that the X-ray beam will be directed perpendicular to the bisector of the angle between the film and the long axis of the tooth being X-rayed, by utilizing an X-ray unit aligning rod, in combination with the novel bite block, which has one end attached to the bite block and a second end which extends away from the bite block at an angle and in such a direction that the second end provides a guide and reference with respect to a line which is perpendicular to the bisector of the angle between the X-ray film and the long axis of the tooth whenever the device is disposed within the mouth.

Other objects and advantages of the present invention will be realized in view of the following description thereof taken in conjunction with the drawings in which.

Figure 1:
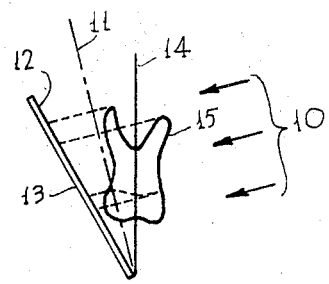
FIG. 1 is an illustration of the bisecting-angle technique.

Referring now to FIG. 1, there is illustrated the bisecting-angle technique. The object of the bisecting-angle technique is to direct the X-ray beam 10 perpendicular to an imaginary plane 11, which bisects the angle formed by the recording plane 12 of the X-ray film 13 and the long axis 14 of the tooth 15 which is to be X-rayed.

In techniques presently in use, it is often quite difficult to properly align the X-ray beam exactly perpendicular to the plane 11 which represents the bisector of the angle between the film and the long axis of the tooth being X-rayed, particularly since the bisector is imaginary and the angle formed by the film with the tooth becomes a matter of individual judgment.

The device for positioning dental X-ray film of the present invention alleviates the foregoing problems in a manner as will now be described in detail in conjunction with the remaining figures of the drawings.

Figure 2:
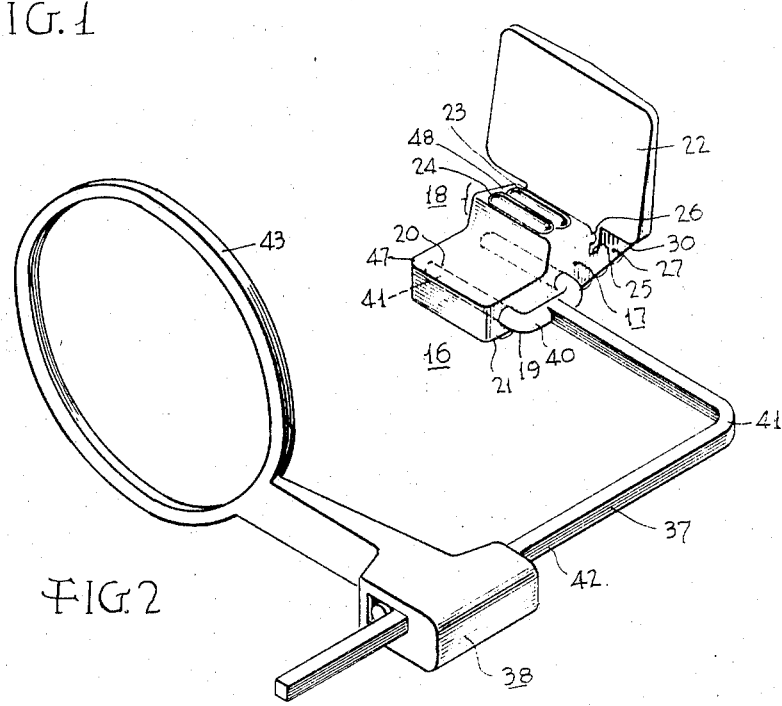
FIG. 2 is an isometric view of the bite block of the present invention as used for posterior radiographs.
Figure 4:
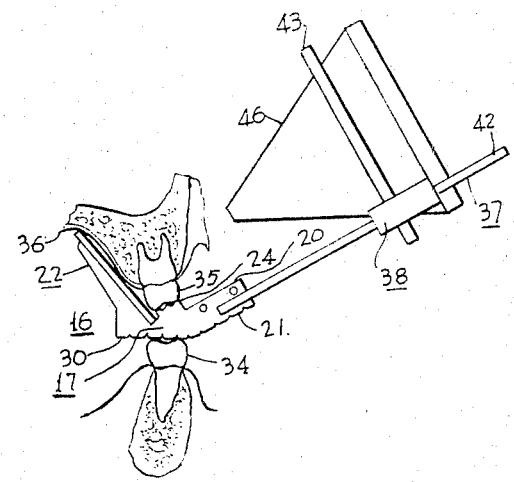
FIG. 4 is an illustration of the device of the present invention in place in the mouth for radiographs of the upper posterior teeth.

Referring now to FIGS. 2 and 4, one part of the present invention is shown which consists of unitary bite block 16. This bite block 16 includes a bite portion 17 which has upper and lower nonparallel surfaces 18 and 19 respectively, thereon. The upper surface 18 further includes an upper extended surface 20 and a bite section 24, while the lower surface 19, likewise includes a bite section 30 and a lower extended surface 21 thereon, which is opposed to and parallel with the upper extended surface 20, all of which will be discussed in more detail later.

Disposed at one end of the bite block 16 is a film-backing portion or plate 22. The plate extends from its base portion 23 upwardly from the bite portion 17 of the bite block 16 to a predetermined height, as will also be discused in more detail later.

Figure 3:
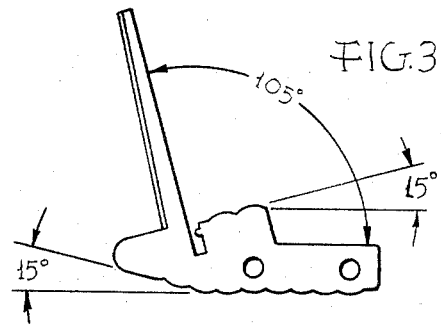
FIG. 3 is a cross-sectional view of the bite block of the present invention showing the specific angularity of selected portions thereof one to another.

The specific angular relationship of the film-backing plate 22 with respect to the longitudinal axis of the bite portion of the bite block, as defined by the parallel surfaces 20 and 21, is critical in the device of the present invention, as well as the angular relationship of the film-backing plate 22 with both bite sections 21 and 30. These specific angular relationships are shown in FIG. 3, in which, it will be noted, that for the preferred embodiment of FIG. 4, the horizontal axis film-backing plate 22 is disposed perpendicular to the longitudinal axis of the bite portion 17, while the vertical axis thereof is disposed at an angle of 105 degrees to the longitudinal axis of the bite portion 17. It will, of course, be readily realized that this angle of 105 degrees accordingly disposes the film-backing plate 22 at an angle of 15 degrees from perpendicular with respect to the longitudinal axis of the bite portion.

The inclined bite section 30 is, in the preferred embodiment of FIG. 4, disposed at an angle of 15 degrees with respect to the upper and lower parallel and opposed extended surfaces 20 and 21, respectively. This bite section 30 is, accordingly, disposed at the angle of 60 degrees with respect to the film-backing plate 22, or at a complementary angle at 120 degrees with respect thereto.

In a like manner, the bite section 24 of the bite portion 19 is inclined or sloped at an angle of 15 degrees with respect to the longitudinal axis of the bite portion of the bite block and is, consequently, perpendicular to the film-backing plate 22.

The foregoing angular relationships of the film-backing plate and the bite surfaces 24 and 30 have been arrived at through extensive clinical study. It has been found that when the film-backing portion 22 of the bite block is inclined at an angle of 15 degrees with respect to the longitudinal axis of the bite portion of the bite block and is of a length of 1⅛ inches for the posterior bite block, these relationships will operate in conjunction with the anatomy of the mouth, whenever the bite block is held between the teeth by the bite surfaces, so as to position film-backing plate at an angle of from 25 to 35 degrees with respect to the tooth being X-rayed for the greater majority of patients.

The position of the bite block within the mouth is also further enhanced by inclining the bite section 30 upwardly at an angle of 15 degrees with respect to the longitudinal axis of the bite portion. This inclined surface provides for better alignment of that portion of the bite block with the opposing teeth which will be in contact with it, while the bite block is held between the teeth. In this manner, undue forces are prevented which would tend to urge the block from its proper angular relationship with the tooth being X-rayed.

It has also been found that the positioning of the bite block within the mouth is further enhanced by inclining the bite section 24 at an angle of 15 degrees with respect to the longitudinal axis of the bite portion of the bite block. The inclination of the bite portion 24 is such that when the bite block is held wtihin the mouth between the opposing teeth 34 and 35, as seen in FIG. 4, the lingual surface of the crown of the tooth being X-rayed will be urged into close relationship with the base 23 of the film-backing plate 22. Such a close relationship is, of course, desirable in radiographs produced by the bisecting angle technique.

The foregoing described angulations and lengths of the various components of the bite block of the present invention will assure that the film-backing plate, and consequently, the film associated therewith, will be disposed at an angle of from 25 to 35 degrees with respect to the tooth being X-rayed. It is now to be recalled that the film-backing plate 22 is disposed at a fixed angle of 105 degrees with respect to the longitudinal axis of the bite portion of the bite block. Consequently, the bisector of the angle formed between the film-backing plate 22 and long axis of the tooth 34 will accordingly vary from —5 degrees to +5 degrees from perpendicular with respect to the longitudinal axis of the bite portion 17 of the bite block 16.

This angular relationship can be advantageously used to assure that the X-ray beam from the X-ray unit will be directed through the bisector of the angle approximately perpendicular thereto. This is accomplished, in the present invention, by means of an X-ray unit aligning rod 37 and its cooperating X-ray unit nose cone or extension tube aligning fixture 38, shown in FIGS. 2 and 4.

The X-ray unit aligning rod 37 includes a first end portion 39 thereof, at one end of which there is disposed a forked connecting member 40, which includes two pins 41 which engage two apertures 24. Each aperture passes through the bite block parallel to the upper and lower opposed extended surfaces 20 and 21 respectively, and perpendicular to the longitudinal axis of the bite portion of the bite block 16. The first end of the rod 39 is constructed and arranged such that it will extend away from the bite portion 17 of the bite block in a direction perpendicular to the longitudinal and vertical axes of the bite portion.

By means of a fixed right angle 41, the second end 42 of the aligning rod is positioned at a right angle with respect to the first end 39 and is further aligned parallel to the longitudinal axis of the bite portion 17 of the bite block.

An X-ray camera nose cone or extension tube aligning fixture 38 is disposed on the second end portion 42 of the aligning rod and has a ring member 43 which extends away from the second end portion 42 of the aligning rod 37 in a direction perpendicular therefrom and upwardly to such a distance that the center of the ring is in alignment with the center of the film-backing plate 22.

Accordingly, it will be appreciated, as shown in FIG. 4, that when the X-ray unit nose cone 46 is aligned parallel with the second end portion 42 of the aligning rod and perpendicular with the aligning ring 43, the X-ray beam will be directed at a perpendicular angle with respect to the bisector of the angle between the long axis of the tooth being X-rayed and the film-backing plate 22. This X-ray beam will also be directed at an angle of 15 degrees from perpendicular with respect to the vertical axis of the film-backing plate 22, and, equally as important, perpendicular to the horizontal axis thereof.

Referring now to FIG. 2, the securement of the bite block 16 within the mouth is further facilitated by means of a plurality of corrugations 48 disposed on the upper and lower bite sections 24 and 30, respectively.

The base 23 of the film-backing plate 22 terminates in a film retaining groove 25. On one side of the film retaining groove 25 is a film clamping projection 26. The width of the film retaining groove is slightly larger than the greatest thickness of film which is anticipated to be used, and the film clamping projection 26 is so constructed and designed that it extends into the film retaining groove 25 a distance to close the groove in that area to a dimension less than the smallest thickness of film anticipated to be used. The retaining groove is allowed to depend into the bite block a sufficient distance to provide an area 27 of reduced cross-sectional area.

The bite block is made of a plastic material which is soft enough to be comfortable to the patient while holding it within his mouth and at the same time, rigid enough to provide the necessary support for the associated components. In the preferred embodiment being discussed, the material is preferably a polyethylene material which is resilient and has an elastic memory.

Figure 6:
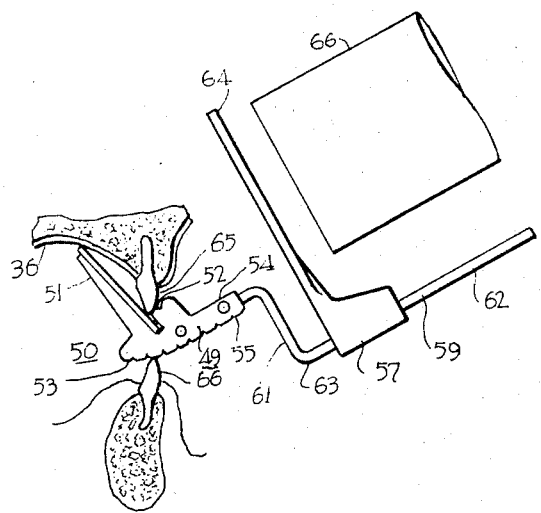
FIG. 6 is an illustration of the device of the present invention in place in the mouth for radiographs of the upper anterior teeth.

In order to insert the film into the bite block 16 as shown in FIGS. 4 and 6, the film-backing plate 22 is deflected to the rear of the bite block. Due to the reduced cross-sectional area 27, the film retaining groove 25 will expand in its width sufficiently to allow the X-ray film to pass into the bottom of the groove. The pressure on the film-backing plate is then released, and due to the elastic memory of the material forming the bite block 16, the retaining groove will accordingly decrease its width and press the film into engagement with the film clamping projection 26 to thus firmly secure the film in the bite block 16. To remove the film, all that need be done is to again deflect the film-backing plate 22 and remove the film from the retaining groove.

Figure 5:
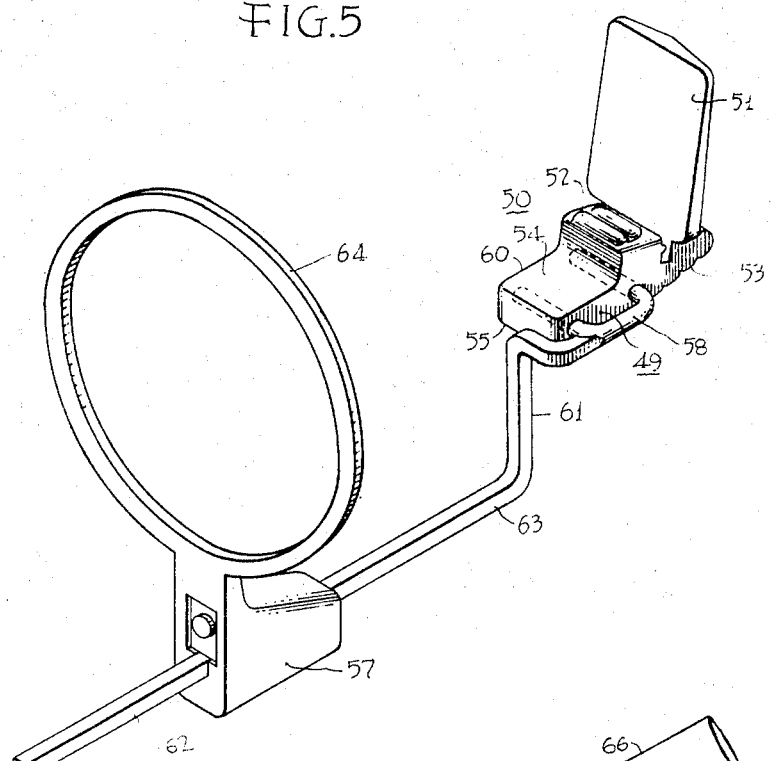
FIG. 5 is an isometric view of the bite block of the present invention as used for anterior radiographs.

The device for producing dental radiographs of the anterior teeth in accordance with the present invention is shown in FIGS. 5 and 6. The anterior bite block 50 differs from the posterior bite block 16 only in that the film back-up plate 51 is preferably 1¼ inches in length rather than 1⅛ inches, as in the case of the posterior block. Further, the entire profile of anterior block 50, including the film back-up plate 51, is of a more narrow configuration than the posterior block 16. The angularity of the film back-up plate 51 and upper and lower bite sections 52 and 53, respectively, are the same with respect to each other and to the upper and lower opposed extended parallel surfaces 54 and 55, respectively, as in the posterior bite block 16, shown in FIG. 3.

The angularity of the respective portions of the anterior bite block and the length thereof are so designed, as in the case of the posterior block, to cause the film back-up plate 51 of the anterior bite block to be disposed at an angle of from 25 to 35 degrees with respect to the long axis of the tooth being X-rayed whenever the bite block is held in the anterior portion of the mouth between opposing teeth, as shown in FIG. 6.

The anterior instrument for producing dental radiographs, according to the present invention, also utilizes an X-ray unit aligning rod 56 and an X-ray nose cone or extension tube aligning fixture 57 in a manner similar to that employed in the posterior instrument, as shown in FIGS. 3 and 4.

The X-ray unit aligning rod of the anterior instrument also includes a forked connecting member 58 which, as for the posterior instrument, has two pins 59 which connect with the bite block by means of holes or apertures 60 therein, which are disposed perpendicular to the longitudinal axis of the bite portion of the bite block and extend therethrough parallel to the opposed extended upper and lower surfaces 54 and 55, respectively thereof. A first end portion 61 of the X-ray unit aligning rod 56 is connected to the forked connecting member 58 and is so constructed as to be disposed behind the bite portion of the bite block and extend downwardly therefrom in a direction perpendicular to the opposed extended surfaces 54 and 55. A second portion 62 of the aligning rod 56 extends away from the first portion 61 thereof, by means of a fixed right angle 63, in a direction parallel to, but offset from, the longitudinal axis of the bite portion of the bite block 50. The fixture 57, like the fixture 38 of the posterior instrument, further includes a nose cone or extension tube aligning ring 64, which is disposed perpendicular to the second end 62 of the aligning rod 56 and is so dimensioned that the center of the ring 64 is in alignment with the center of the film back-up plate 51.

This arrangement, as shown in FIG. 6, will direct the X-ray beam at an angle perpendicular to the bisector of the angle between the long axis of the tooth 65 being X-rayed and the film back-up plate 51, whenever the anterior instrument is held between the opposing teeth 65 and 66 and the X-ray extension tube 66 is aligned parallel to the second end portion 62 of the aligning rod and centered on and disposed perpendicular to the plane of the aligning ring 64. The foregoing arrangement also provides for proper horizontal angularity of the X-ray beam as well, since the second end portion 62 of the aligning rod is disposed perpendicular to the horizontal axis of the film back-up plate.

While the foregoing description of the posterior and anterior bite blocks of the present invention has been made utilizing particular dimensions of the film back-up plate and angulations of the various components thereof, the objects of the invention can nevertheless still be accomplished even though these specific angles and dimensions vary through given tolerences. In the case of the film back-up plate 22 or 51 of either the posterior or anterior bite block respectively, the device has been found to work well if this angle is allowed to vary between 100 degrees and 110 degrees with respect to the longitudinal axis of the bite portion of the bite blocks. Also, the angle at which the lower bite section 30 or 53 of either the posterior or anterior bite block respectively, may be allowed to vary between 10 and 20 degrees. In the case of the upper bite sections 24 and 52 of either bit block, the allowed tolerances have been found to be between zero and thirty degrees with respect to the longitudinal axis of the bite section of each of the bite blocks.

The film-backing plate 22 of the posterior bite block 16 may be allowed to vary within the range of 1 inch to 1¼ inches without unduly affecting the positioning of the bite block within the mouth. The film backing plate 51 of the anterior instrument, may accordingly, vary within the range of 1¼ inches to 1½ inches.

In the preferred embodiment of the anterior and posterior bite blocks, the width and thickness of the bite portions 17 and 49 of each block is ¾ of an inch and ¼ of an inch respectively. The width of the film-backing portion 22 for the posterior block is preferably 1⁵⁄₁₆ inches, while that of the anterior block is ¾ of an inch.

While preferred embodiments of the present invention have been shown in the drawings and described in the specification including preferred dimensions, angles, and materials therefor, the invention is not thereby intended to be so limited, but includes such changes and modifications therein as lie within the scope and spirit of the appended claims.

What is claimed is:

1. A device for positioning dental X-ray film within the mouth at a standardized and constant angle with respect to the teeth being X-rayed to produce radiographs in accordance with the bisecting-angle technique comprising:
   a unitary block having a bite portion and a film-backing portion disposed at one end of said bite portion and projecting upwardly therefrom, said bite portion including nonparallel substantially planar upper and lower surfaces thereon adapted to be clenched between the teeth extending to and intersecting the plane of said film-backing portion;
   said upper surface of said bite portion inclined downwardly at an angle of 10 degrees to 30 degrees with respect to the longitudinal axis of said bite portion and toward said film-backing portion;
   said lower surface of said bite portion at the same end thereof as said film-backing portion further including a portion thereof inclined upwardly at an angle of 10 degrees to 20 degrees with respect to the longitudinal axis of said bite portion and toward said film-backing portion; and
   said inclined upper surface, said inclined portion of said lower surface of said bite portion, and said film-backing portion being juxtapositioned one to another so that when said bite block is held between the teeth the film-backing portion will be maintained at an angle of between 25 degrees and 35 degrees with respect to the long axis of the tooth being X-rayed and the tooth being X-rayed will be urged toward said film-backing portion to a position immediately adjacent thereto.

2. The device for positioning dental X-ray film according to claim 1 wherein said film-backing portion is disposed at an angle of from 100 to 110 degrees with respect to the longitudinal axis of said bite portion.

3. The device for positioning dental X-ray film according to claim 1 further including an X-ray unit aligning rod having a first end portion secured to said bite portion of said bite block and a second end portion thereof projecting away from said film-backing portion and disposed at an angle of 105 degrees with respect to said film-backing portion to provide a quick and positive alignment of an X-ray beam at 15 degrees from perpendicular with respect to said film-backing portion.

4. The device for positioning dental X-ray film according to claim 1 with the length of said film-backing portion within the range of from 1 to ¼ inches to adapt said bite block for the production of radiographs of the posterior teeth.

5. The device for positioning dental X-ray film according to claim 1 with the length of said film-backing portion within the range of from 1¼ to 1½ inches to adapt said bite block for the production of radiographs of the anterior teeth.

References Cited

UNITED STATES PATENTS

| | | | |
|---|---|---|---|
| 1,906,223 | 5/1933 | Buck | 250—70 |
| 1,923,669 | 8/1933 | Harrison | 250—70 X |
| 2,034,049 | 3/1936 | Levy | 250—69 X |
| 2,090,933 | 8/1937 | Bolin | 250—70 X |
| 2,777,068 | 1/1957 | Bowser | 250—70 X |

WILLIAM F. LINDQUIST, Primary Examiner